United States Patent
Hasegawa et al.

[11] Patent Number: 6,019,589
[45] Date of Patent: Feb. 1, 2000

[54] LASER PROCESSING APPARATUS AND METHOD FOR MANUFACTURING A LIQUID JET RECORDING HEAD BY USE OF SUCH LASER PROCESSING APPARATUS

[75] Inventors: Toshinori Hasegawa, Kawasaki; Akira Goto; Shin Ishimatsu, both of Yokohama, all of Japan

[73] Assignee: Canon Kabushiki Kaisha, Japan

[21] Appl. No.: 08/785,964

[22] Filed: Jan. 22, 1997

[30] Foreign Application Priority Data

Jan. 24, 1996 [JP] Japan .................................. 8-029864

[51] Int. Cl.⁷ .................................................. B23K 26/06
[52] U.S. Cl. .................................. 425/174.4; 219/121.68; 219/121.75; 219/121.7; 264/400
[58] Field of Search .................................. 264/400, 482, 264/406, 409; 425/174.4; 219/121.6, 121.61, 121.62, 121.73, 121.75, 121.77, 121.68, 121.7

[56] References Cited

U.S. PATENT DOCUMENTS

| | | | |
|---|---|---|---|
| 3,571,554 | 3/1971 | Baujoin . | |
| 3,742,182 | 6/1973 | Saunders | 264/400 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 4,842,782 | 6/1989 | Portney et al. | 264/400 |
| 5,365,032 | 11/1994 | Muller et al. . | |
| 5,378,137 | 1/1995 | Asakawa et al. | 264/400 |
| 5,482,660 | 1/1996 | Yamamoto et al. | 264/482 |

FOREIGN PATENT DOCUMENTS

| | | |
|---|---|---|
| 0538842 | 4/1993 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 7-060470 | 3/1995 | Japan . |

*Primary Examiner*—Mathieu D. Vargot
*Attorney, Agent, or Firm*—Fitzpatrick, Cella, Harper & Scinto

[57] ABSTRACT

A laser processing apparatus is provided with a light source to generate laser beam, a lens to guide laser beam to a predetermined portion of a blank that becomes a structural member of a liquid jet recording head, a split prism arranged on the optical path between the light source and the lens. This laser processing apparatus is arranged to further include a rotary mechanism capable of rotating the lens centering on the optical axis of the laser beam. With the structure thus arranged, it is possible to prevent the lens from being locally damaged by the irradiation of laser beam, thus making the life of the lens longer, while reducing the frequency of lens replacements. This arrangement leads to the implementation of a significant reduction of maintenance costs of the apparatus, as well as to the simplified manufacture of a liquid jet recording head at lower costs.

4 Claims, 3 Drawing Sheets

LASER PROCESSING APPARATUS AND METHOD FOR MANUFACTURING A LIQUID JET RECORDING HEAD BY USE OF SUCH LASER PROCESSING APPARATUS

BACKGROUND OF THE INVENTION

1. Field of the Invention

The present invention relates to a laser processing apparatus that irradiates laser beam onto an object and processes the portions thereof where the laser beam is irradiated, and also, relates to a method for manufacturing a liquid jet recording head whereby to provide the resin ceiling plate of the head with the grooves to form liquid paths, holes, and others by use of such laser processing apparatus.

2. Related Background Art

In recent years, it has become possible for a laser processing apparatus to execute a precise processing. Therefore, the apparatus is used for producing liquid jet recording heads and semiconductor substrates, for example.

The description will be made of an example in which a laser apparatus is adopted and used for producing a liquid jet recording head.

The liquid jet recording head, which records (prints) on a recording medium (a recording paper sheet or the like) by discharging recording liquid (ink) from fine discharge ports (orifices) as flying droplets, is provided with a substrate (heater board) having on it a plurality of electrothermal transuding elements and lead electrodes therefor. It is generally practiced that a glass ceiling plate having a recording liquid supplying tube is overlaid on the substrate after a resin nozzle layer (liquid path formation layer) is laminated on the board, which forms liquid paths (nozzles) and a common liquid chamber. However, a resin ceiling member (hereinafter referred to as a resin ceiling plate) has been developed recently and produced by means of an injection molding or the like to integrally form liquid paths and a common liquid chamber, together with a recording liquid supplying tube and others, while omitting the provision of the glass ceiling plate. This ceiling member is then compressed by means of an elastic member so that it is formed together with the substrate. A liquid jet recording head of the kind contributes to reducing the number of assembling parts, and also, to simplifying the assembling processes significantly. Therefore, it is anticipated that the costs of a liquid jet recording apparatus are reduced remarkably when manufactured.

FIG. 3 is a view which shows the principal part of a liquid jet recording head $E_0$ using a resin ceiling plate. Here, in FIG. 3, the resin ceiling plate is partly broken in its representation.

The liquid jet recording head shown in FIG. 3 is provided with a substrate 1001 having on it a plurality of electrothermal transducing elements 1001a, and a resin ceiling plate 1002 having the liquid paths 1002a positioned on each of the electrothermal transducing elements, and a common liquid chamber 1002b conductively connected with them. The resin ceiling plate 1002 is integrally formed with discharge ports (orifices) 1002c conductively connected with each of the liquid paths 1002a, together with a cylindrical extrusion 1002f having a recording liquid supplying port 1002e, which is open to the common liquid chamber 1002b.

The resin ceiling plate 1002, which is provided with such liquid paths 1002a and common liquid chamber 1002b for its main body, and also, provided additionally with the orifice plate 1002d and the cylindrical extrusion 1002f, is integrally formed by means of an injection molding and others. Then, the resin ceiling plate 1002 is compressed by an elastic member (not shown) onto the substrate 1001 after positioning them so that each of the liquid paths 1002a is placed on each of the electrothermal transducing elements 1001a. Thus, the plate and substrate are coupled together. The substrate 1001 is fixed to a base plate 1004 by use of screws or some other known means, together with a printed-circuit board 1003 having on it a driving circuit that generates electric signals given to each of the electrothermal transducing elements.

In this respect, a method of manufacture has been developed to prepare a blank (a material to form a head) by means of an injection molding, thus providing a main body before the formation of liquid paths 1002a, an orifice plate 1002d before the arrangement of orifices, and some others altogether. Then, by use of excimer laser, the main body of the resin ceiling plate 1002 is grooved to make each of the liquid paths 1002a. Likewise, by use of excimer laser, the orifice plate 1002d is drilled to make each of the orifices 1002c.

In this way, by the combination of an injection molding and a laser processing, it is possible to manufacture resin ceiling plates at lower costs, and promote the further reduction of costs when liquid jet recording heads are manufactured. Here, the laser processing apparatus, which irradiates excimer laser to groove and drill the blank obtained by the injection molding, is generally provided with a light source to generate laser beam; a projection optical system having a lens to project aperture patterns on the blank by use of excimer laser; a split prism arranged on the optical path between the light source and the lens.

In a laser processing apparatus of the kind thus structured, the lens surface of the projection optical system is locally exposed to a high-energy laser beam. Therefore, the surface precision and physical properties of the portion of the lens exposed to such laser beam are easily deteriorated in a short period of time, thus spoiling the optical characteristics of the lens as a whole. This necessitates lens replacements to be made more frequently, leading to the requirement of more labor and time to execute the complicated replacement operation. As a result, the costs of maintenance increase. The laser processing should also be suspended during such lens replacement operation. This inevitably creates a problem that the throughput is significantly reduced. This problem is yet to be solved.

SUMMARY OF THE INVENTION

The present invention is designed in consideration of such problem as has been described above with respect to the conventional techniques. It is an object of the invention to provide a laser processing apparatus capable of performing a precise processing for a long time by use of the same lens, while reducing the frequency of lens replacements. It is another object of the invention to provide a method for manufacturing a liquid jet recording head whose liquid paths and orifices arranged for the resin ceiling plate are formed by a laser processing apparatus using excimer laser, wherein the life of the lens used for such laser processing apparatus is prolonged to implement the significant reduction of maintenance costs.

In order to achieve the objects described above, the laser processing apparatus of the present invention, which is provided with a light source to generate laser beam; a lens to guide the laser beam to a predetermined portion of an object to be laser irradiated; a split prism arranged on the optical path between the light source and lens, is arranged to further comprise a rotary mechanism capable of rotating the lens centering on the optical axis of the laser beam.

Also, the method of the present invention for manufacturing a liquid jet recording head comprises the following steps of:

preparing a blank that becomes a structural member of a liquid jet head;

forming discharge ports and/or grooves for liquid paths by irradiating laser beam onto the blank by use of a laser processing apparatus provided with a light source to generate laser beam, a lens to guide the laser beam to a predetermined portion of the structural member of a liquid jet head, a split prism arranged on the optical path between the light source and lens, and a rotary mechanism capable of rotating the lens centering on the optical axis of the laser beam; and driving the rotary mechanism after confirming the lowered resolution of the blank.

Further, the method of the present invention for manufacturing a liquid jet recording head comprises the following steps of:

preparing a blank that becomes a structural member of a liquid jet head;

forming discharge ports and/or grooves for liquid paths by irradiating laser beam onto the blank by use of a laser processing apparatus provided with a light source to generate laser beam, a lens to guide the laser beam to a predetermined portion of the structural member of a liquid jet recording head, a split prism arranged on the optical path between the light source and lens, and a rotary mechanism capable of rotating the lens centering on the optical axis of the laser beam, while continuously or intermittently driving the rotary mechanism thereof.

It is preferable to rotate the lens while the grooves are being processed by use of excimer laser.

It may be possible to rotate the lens per processing cycle using excimer laser.

Also, it may be possible to rotate the lens after confirming any damages caused on the lens by use of excimer laser.

With the structure arranged as described above, the present invention demonstrates the effects given below.

In the step of forming liquid paths and orifices for a resin ceiling plate by means of groove formation process using excimer laser, it is possible to prolong the life of the lens of the laser processing apparatus, thus reducing the maintenance costs, while enhancing its throughput. Therefore, the invention contributes to implementing the significant cost reduction when manufacturing liquid jet recording heads.

DETAILED DESCRIPTION OF THE PREFERRED EMBODIMENTS

Hereinafter, with reference to the accompanying drawings, the description will be made of the embodiments in accordance with the present invention.

Figure 1A:
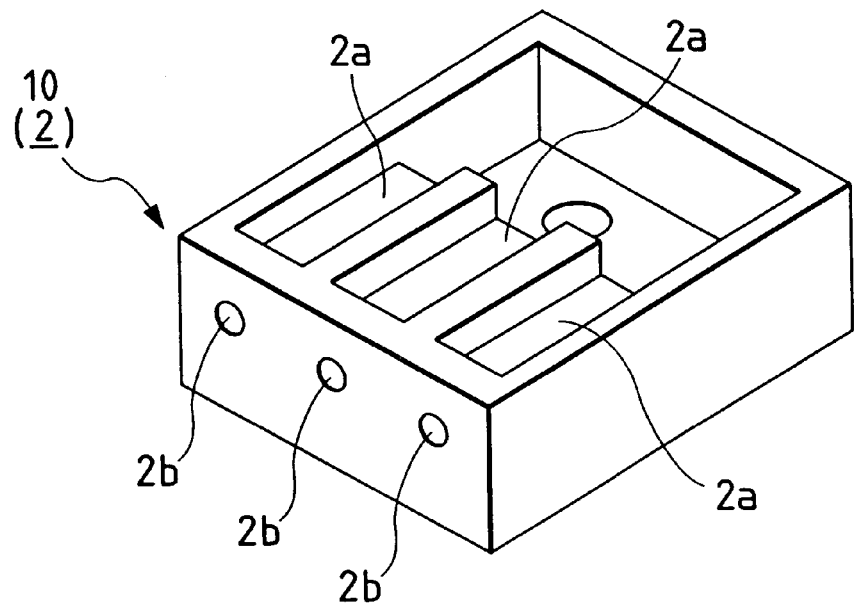
FIGS. 1A and 1B are views which illustrate a method for manufacturing a liquid jet recording head in accordance with one embodiment of the present invention.
Figure 1B:
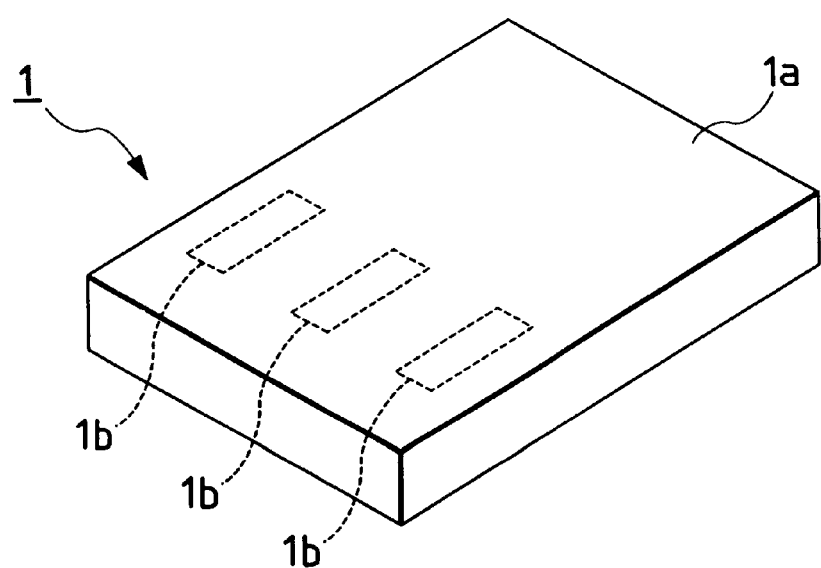

FIGS. 1A and 1B are views which illustrate a method for manufacturing a liquid jet recording head in accordance with one embodiment of the present invention. At first, a blank 10 (FIG. 1*a*), which is a roughly-formed resin member provided with a recessed portion that becomes a common liquid chamber for the liquid jet recording head, is integrally formed by a known injection molding or the like, and then, liquid paths 2*a* are formed by means of groove formation process using excimer laser. Further, orifices 2*b* are drilled also using excimer laser. The resulting resin ceiling plate (2) thus obtained, which serves as a liquid path formation layer, is positioned and joined to a substrate 1, (FIG. 1B) having electrothermal transducing elements 1*b* on its surface 1*a*.

Figure 2:
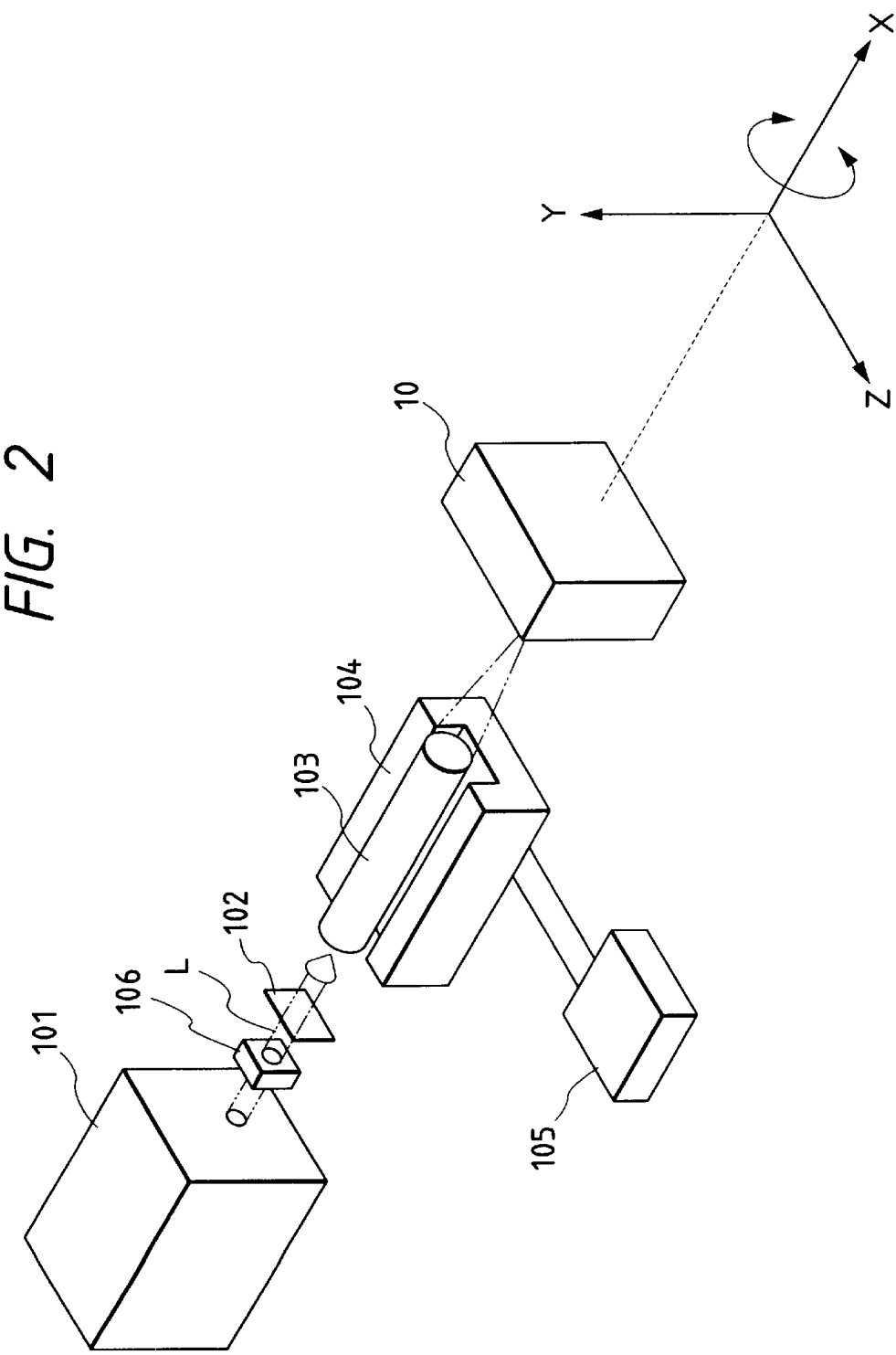
FIG. 2 is a view which illustrates a laser processing apparatus in accordance with the present embodiment.
Figure 3:
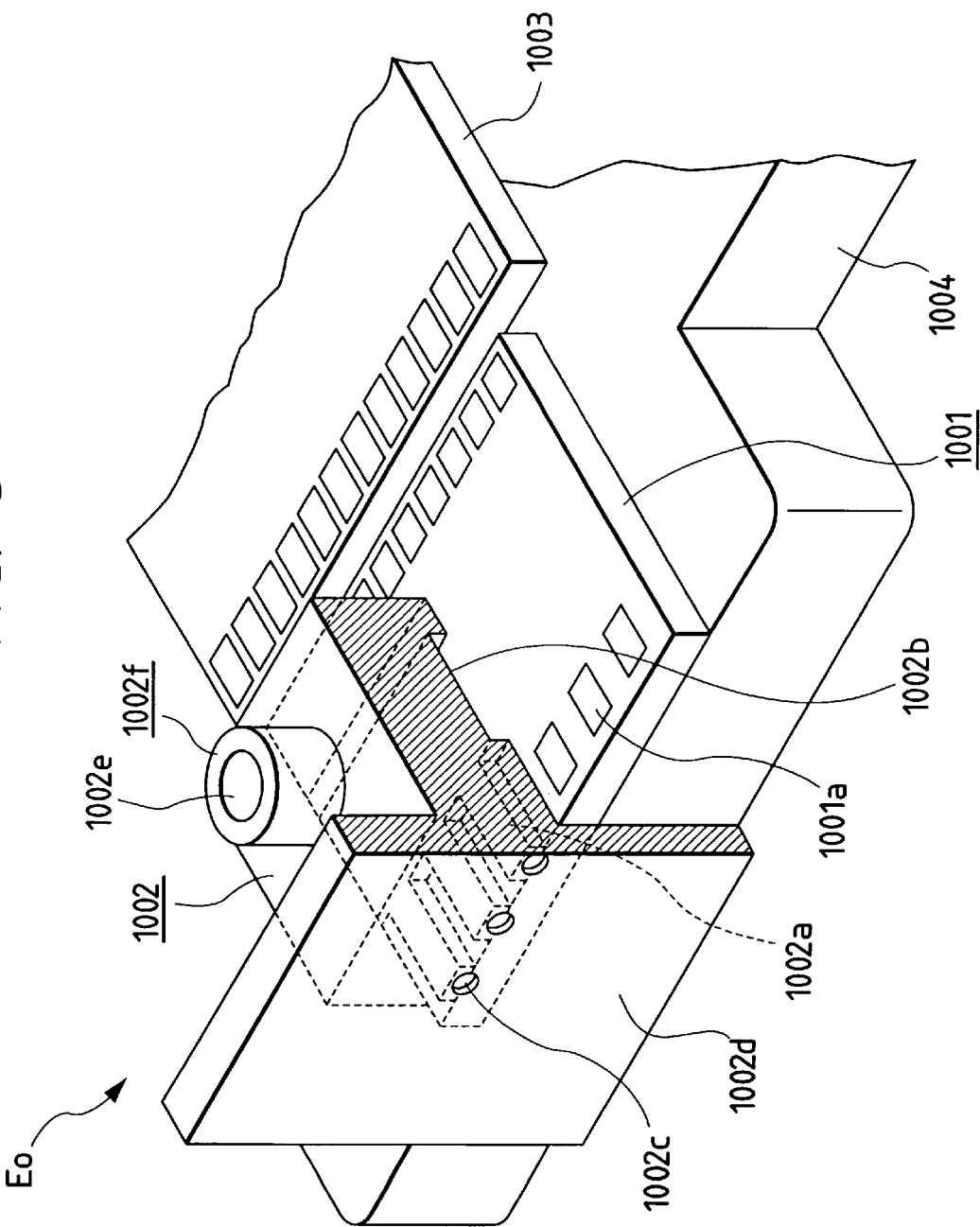
FIG. 3 is a partly broken perspective view which shows the structure of a liquid jet recording head.

The laser processing apparatus used for such grooving and drilling comprises, as shown in FIG. 2, a light source 101 to generate excimer laser; a split prism 106 to split the laser beam into plural beams; a mask 102 having aperture patterns for use of grooving and drilling; a projection optical system 103 to project the aperture patterns onto the blank 10; a rotary driving device 104 to rotate the projection optical system 103 around the optical axis of the excimer laser L; and a controller 105 to control the rotary driving device.

The blank 10 is positioned by means of a traveling stage (not shown) within a plane (Y-Z plane) perpendicular to the optical axis (the axis X) of excimer laser. Here, the excimer laser L that has transmitted the mask 102 causes damages locally on the lens surface of the projection optical system 103. As a result, the surface precision, the physical properties, and others are spoiled so as to cause the optical characteristics of the lens to be deteriorated as a whole in a short period of time. This requires the replacement of lenses often. Now, therefore, the rotary driving device 104 is driven continuously or intermittently during the exposing period of excimer laser, thus rotating the projection optical system 103 or arranging to rotate the projection optical system 103 per processing cycle for grooving or drilling one or plural pieces of the blank 10. In this way, the lens surface is prevented from being damaged locally.

Also, as a method for rotating a projection optical system, it may be possible to adopt a way in which the projection optical system 103 is rotated after confirming any local damage given to the lens surface of the projection optical system 103 so that the new surface of the lens can be used. In this case, from the viewpoint of automatizing a system, it is desirable to arrange an image sensor for the laser processing apparatus in order to sense the current resolution status of a blank, and then, a rotary driving device is driven on the basis of information thus obtained from the image sensor.

In this way, there is no possibility in accordance with the present invention that only one part of the lens of a projection optical system is intensively used, thus making it possible to prevent the optical characteristics of the lens of the projection optical system 103 from being deteriorated in a short period of time, and to reduce the replacement frequency of lenses for the projection optical system 103.

In accordance with the present embodiment, now that the life of the lens of the projection optical system is made longer for a laser processing apparatus that grooves and drills the resin ceiling plate of a liquid jet recording head, it is possible to reduce the maintenance costs of the projection optical system, while enhancing the throughput of the laser processing apparatus significantly.

Of the liquid jet recording methods, the present invention demonstrates excellent effects particularly when it is applied to a recording head and a recording apparatus of the so-called ink jet recording method that performs recording with the formation of flying droplets by the utilization of thermal energy.

Regarding the typical structure and operational principle of such method, it is preferable for the present invention to adopt those which can be implemented using the fundamental principle disclosed in the specifications of U.S. Pat. Nos. 4,723,129 and 4,740,796, for example. This method is applicable to the so-called on-demand type recording system and continuous type recording system as well.

To briefly describe this recording method, discharge signals are supplied from a driving circuit to electrothermal transducing elements, which serve as discharge energy generating elements, disposed on a liquid (ink) retaining sheet or the respective liquid paths. In other words, according to recording information, at least one driving signal is given in order to provide recording liquid (ink) with a rapid temperature rise so that film boiling phenomenon, which is beyond nuclear boiling phenomenon, is created in the liquid, thus generating thermal energy to cause film boiling on the thermoactive surface of the recording head. Since an air bubble can be formed from the recording liquid (ink) by means of the driving signal given to an electrothermal transducing element one to one, this method is particularly effective for the on-demand type recording method. By the development and contraction of the bubble, the liquid (ink) is discharged through a discharge port to produce at least one droplet. The driving signal is more preferably in the form of pulses because the development and contraction of the bubble can be effectuated instantaneously and appropriately, making it possible to discharge liquid (ink) with quicker response. The driving signal in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for an excellent recording in a better condition.

The present invention is applicable to the structure of the recording head as shown in each of the above-mentioned specifications wherein the structure is arranged to combine the discharging ports, liquid paths, and the electrothermal transducing elements (linear type liquid paths or right-angled liquid paths). Besides, it is equally and effectively applicable to the structure such as disclosed in the specifications of U.S. Pat. Nos. 4,558,333 and 4,459,600 in which the thermal activation portions are arranged in a curved area.

In addition, the present invention is effectively applicable to the structure disclosed in Japanese Patent Laid-Open Application No. 59-123670 wherein a common slit is used as the discharging ports for plural electrothermal transducing elements, and to the structure disclosed in Japanese Patent Laid-Open Application No. 59-138461 wherein an aperture for absorbing pressure wave of the thermal energy is formed corresponding to the discharge ports.

Further, as a recording head for which the present invention can be utilized effectively, there is the full-line type recording head whose length corresponds to the maximum width of a recording medium recordable by such recording apparatus. For the full-line type recording head, it may be possible to adopt either a structure whereby to satisfy the required length by combining a plurality of recording heads or a structure arranged by one recording head integrally formed.

In addition, the present invention is effectively applicable to an exchangeable recording head of a chip type that can be electrically connected with the apparatus main body, the ink supply therefor being made possible from the apparatus main body, when mounted on the apparatus main body or to the use of a cartridge type recording head provided integrally for a recording head itself.

Also, it is preferable to additionally provide a recording head with recovery means and preliminarily auxiliary means because these additional means will contribute to making the effectiveness of a recording apparatus more stabilized. To name them specifically, these are capping means, cleaning means, suction or compression means, preheating means such as electrothermal transducing elements or heating elements other than such transducing elements or the combination of those types of elements, and a predischarge means for performing discharge other than the regular discharge from the recording head.

Also, as the recording modes of a recording apparatus, the present invention is not only applicable to a recording mode in which only one main color such as black is used for recording, but also, the invention is extremely effective in applying it to an apparatus having plural recording heads provided for use of at least one of multiple colors prepared by different colors or a full-color prepared by mixing colors, irrespective of whether the recording heads are integrally structured or structured by a combination of plural recording heads.

For the present invention, the most effective method applicable to various kinds of ink referred to in the preceding paragraph is the one that enables the film boiling method to be effectuated as described above.

Furthermore, as the mode of the recording apparatus of the present invention, it may be possible to adopt a copying apparatus combined with a reader, in addition to the image output terminal for a computer or other information processing apparatus. Also, it may be possible to adopt a mode of a facsimile equipment provided with transmitting and receiving functions.

In the above embodiments of the present invention, ink has been described as liquid, but it may be an ink material which is solidified below the room temperature but soften or liquefied at the room temperature or which is soften or liquefied within the temperature range of a temperature adjustment generally practiced for ink jet recording, that is, not lower than 30° C. but not higher than 70° C. In other words, if only ink can be liquefied at the time of giving recording signals any ink material should be good enough for use. In addition, while positively preventing the temperature rise due to thermal energy by consuming such energy for the changes of state of ink from solid to liquid, or by use of the ink which will be solidified when left intact for preventing the ink evaporation, it may be possible for the present invention to adopt an ink having a nature of being liquefied only by the application of thermal energy, such as an ink capable of being discharged as ink liquid by enabling itself to be liquefied anyway when the thermal energy is applied in accordance with recording signals, and an ink which will have already begun solidifying itself by the time it reaches a recording medium. In such a case, it may be possible to retain ink in the form of liquid or solid in the recesses or through holes of a porous sheet such as disclosed in Japanese Patent Laid-Open Application No. 54-56847 or 60-71260 in order to enable the ink to face the electrothermal transducing elements. For the present invention, the most effective method adoptable for the various kinds of ink mentioned above is the one that makes it possible to effectuate the film boiling method as described above.

In this respect, it has been illustrated for the above embodiments that the laser processing apparatus of the present invention is applied to the manufacture of an liquid jet recording head. However, the invention is not necessarily limited thereto. For example, the invention includes a case where the laser processing apparatus described above is applied to the formation of through holes for a semiconductor substrate.

What is claimed is:

1. A laser processing apparatus characterized by prolonged lens life comprising:
    a light source to generate a laser beam;
    a lens for guiding said laser beam to a predetermined portion of an object to be irradiated by said laser beam;
    a split prism arranged along the optical path between said light source and said lens;
    a mask provided on the optical path between said light source and said lens for controlling the laser irradiation area and
    a rotary mechanism capable of rotating said lens with respect to said split prism centering on the optical axis of said laser beam to prevent the lens surface from being damaged locally.

2. A laser processing apparatus according to claim 1, further comprising:
    an image sensor for observing the processing precision of said object to be irradiated by said laser beam; and
    a rotary mechanism driving device for driving said rotary mechanism in accordance with information obtainable from said image sensor.

3. A laser processing apparatus according to claim 1, wherein a rotary mechanism driving device is provided for driving said rotary mechanism per processing cycle using said laser beam.

4. A laser processing apparatus according to claim 1, wherein said laser beam is an excimer laser beam.

* * * * *

UNITED STATES PATENT AND TRADEMARK OFFICE
CERTIFICATE OF CORRECTION

PATENT NO. : 6,019,589
DATED : February 1, 2000
INVENTOR(S) : Toshinori Hasegawa et al.

Page 1 of 1

It is certified that error appears in the above-identified patent and that said Letters Patent is hereby corrected as shown below:

<u>Title page,</u>
Item [73], Assignee, "Canon Kabushiki Kaisha, Japan" should read -- Canon Kabushiki Kaisha, Tokyo, Japan --.

<u>Column 1,</u>
Line 29, "transuding" should read -- transducing --.

<u>Column 3,</u>
Line 23, "head;" should read --head; and --.

<u>Column 4,</u>
Line 7, "(2)" should read -- (<u>2</u>) --; and
Line 9, "substrate 1," should read -- substrate 1 --.

<u>Column 6,</u>
Lines 35 and 36, "soften" should read -- softened --;
Line 65, "an" should read -- a --.

<u>Column 7,</u>
Line 14, "area" should read -- area; --.

Signed and Sealed this

Nineteenth Day of March, 2002

*Attest:*

*Attesting Officer*

JAMES E. ROGAN
*Director of the United States Patent and Trademark Office*